US009749296B1

(12) United States Patent
Kaushik et al.

(10) Patent No.: US 9,749,296 B1
(45) Date of Patent: Aug. 29, 2017

(54) METHOD AND APPARATUS FOR MODIFYING ADDRESS INFORMATION IN SIGNALING MESSAGES TO ENSURE IN-PATH DEVICES REMAIN IN SIGNALING PATH BETWEEN ENDPOINTS

(75) Inventors: Meenakshi Kaushik, Sunnyvale, CA (US); Francois Audet, Sunnyvale, CA (US); Samir Srivastava, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 1885 days.

(21) Appl. No.: 11/592,599

(22) Filed: Nov. 3, 2006

Related U.S. Application Data

(60) Provisional application No. 60/818,018, filed on Jun. 30, 2006.

(51) Int. Cl.
  *H04L 12/743* (2013.01)
  *H04L 29/06* (2006.01)

(52) U.S. Cl.
  CPC .................................. *H04L 63/029* (2013.01)

(58) Field of Classification Search
  CPC ............... H04L 63/029; H04L 63/2564; H04L 65/1003; H04L 65/1006
  See application file for complete search history.

(56) References Cited

U.S. PATENT DOCUMENTS

| | | | | |
|---|---|---|---|---|
| 5,953,404 | A  * | 9/1999  | Fikis et al. | 379/230 |
| 6,956,832 | B1 * | 10/2005 | Muhonen et al. | 370/310 |
| 7,167,441 | B2 * | 1/2007  | Donoghue et al. | 370/216 |
| 7,681,038 | B1 * | 3/2010  | Dawson | H04L 63/08 713/168 |
| 8,553,700 | B1 * | 10/2013 | Dawson | H04L 63/08 370/395.2 |
| 2002/0112073 | A1 * | 8/2002 | MeLampy | H04L 29/06027 709/240 |
| 2003/0009561 | A1 * | 1/2003 | Sollee | 709/227 |
| 2003/0058806 | A1 * | 3/2003 | Meyerson | H04L 12/58 370/260 |
| 2003/0090996 | A1 * | 5/2003 | Stewart | 370/225 |
| 2004/0073658 | A1 * | 4/2004 | Oran et al. | 709/224 |
| 2005/0025047 | A1 * | 2/2005 | Bodin et al. | 370/229 |
| 2005/0044127 | A1 * | 2/2005 | Jaiswal et al. | 709/200 |
| 2005/0058125 | A1 * | 3/2005 | Mutikainen et al. | 370/354 |
| 2005/0220095 | A1 * | 10/2005 | Narayanan et al. | 370/389 |
| 2006/0075132 | A1 * | 4/2006 | Liu | 709/236 |
| 2006/0149836 | A1 * | 7/2006 | Robertson et al. | 709/224 |

OTHER PUBLICATIONS

Rosenberg, J. et al. "SIP: Session Initiation Protocol", Internet Engineering Task Force (IETF), Network Working Group, Request for Comments (RFC) 3261, http://tools.ietf.org/pdf/rfc3261.pdf, Jun. 2002, 270 pgs.

* cited by examiner

*Primary Examiner* — Parth Patel
*Assistant Examiner* — Jason Harley
(74) *Attorney, Agent, or Firm* — Sheridan Ross P.C.

(57) ABSTRACT

Contact information in SIP signaling messages is modified at each in-path network device during the signaling process (along with storage of mapping information) to allow the in-path network devices (and proxy server) to identify the next (or previous) hop device in the path, and thus, maintain the path taken by signaling messages early on during the signaling process. Subsequent request and response signaling messages transmitted during the session follow this path, which ensures that the in-path network devices remain in the SIP signaling path.

23 Claims, 4 Drawing Sheets

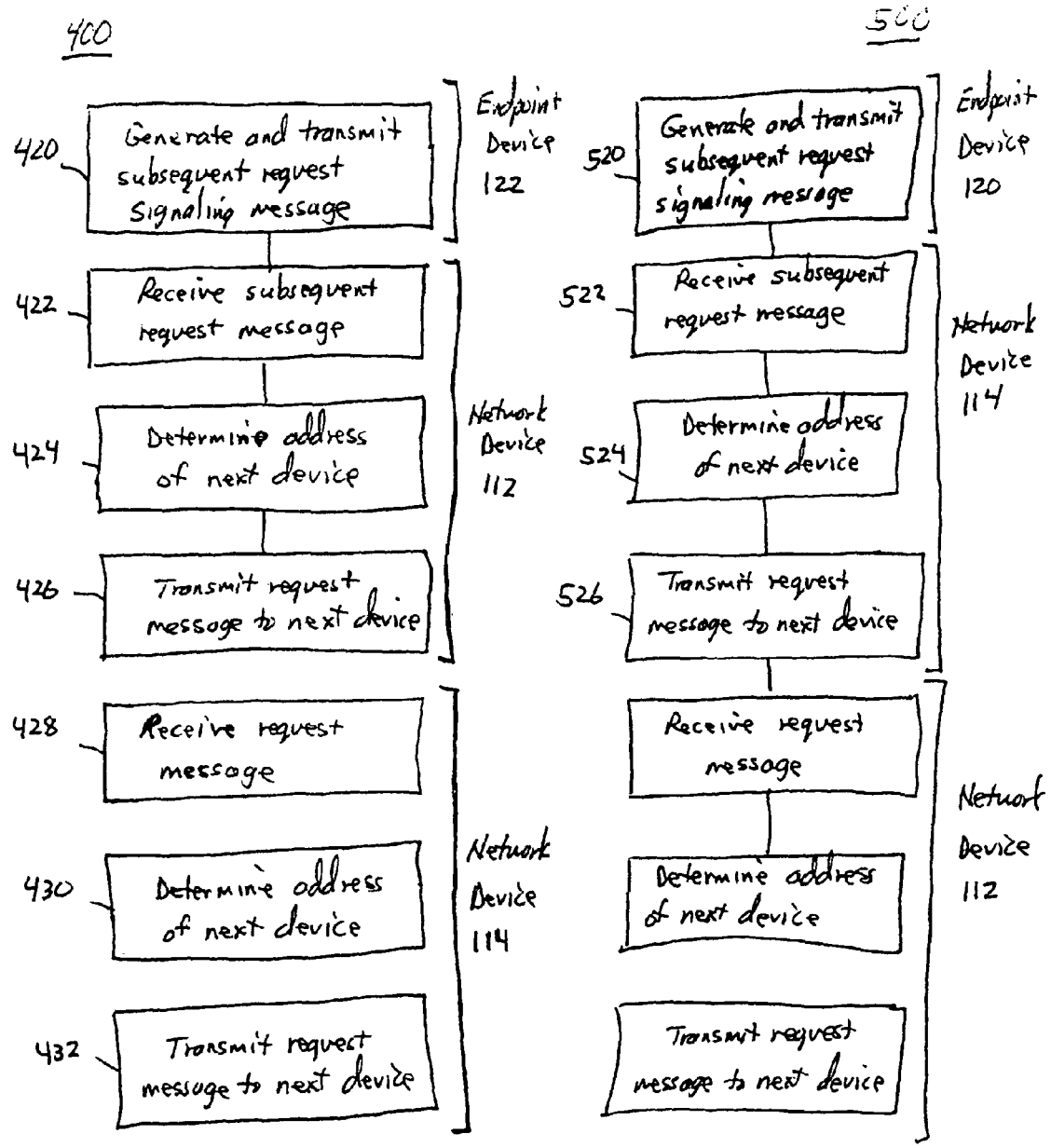
FIGURE 4                    FIGURE 5

METHOD AND APPARATUS FOR MODIFYING ADDRESS INFORMATION IN SIGNALING MESSAGES TO ENSURE IN-PATH DEVICES REMAIN IN SIGNALING PATH BETWEEN ENDPOINTS

CROSS-REFERENCE TO RELATED APPLICATION

This application claims priority under 35 USC 119(e) to U.S. provisional Application Ser. No. 60/818,018, filed on Jun. 30, 2006, and which is incorporated herein by reference.

TECHNICAL FIELD

The present invention relates generally to communication networks, and more particularly to a method and apparatus for modifying addressing/contact information in Session Initiated Protocol (SIP) signaling messages to ensure that the apparatus remains in a given signaling path (e.g., between an endpoint and a SIP proxy/registrar server) over which the SIP signaling messages will travel during the SIP session.

BACKGROUND

Session Initiated Protocol (SIP) is a well-known protocol utilized to set up sessions between endpoints and is described in the Internet Engineering Task Force (IETF) specification RFC 3261 (and all related RFCs and drafts), which are incorporated herein by reference.

Each user (generally a client device) initially registers its network address with a registrar or location server using a registration process. The registrar server (or database) maintains the network address for each user within a particular domain (multiple servers may be utilized). Session initiation begins when a source user transmits an invite request to a proxy server, which in turn, queries a registrar to determine the network address of the intended destination user (this may include the invite request traveling through additional proxies depending on the destination user). During a handshaking signaling process, the network address of the destination user device is determined and forwarded to the source user device. Thereafter, the source user device and destination user device communicate directly in a session using each other's known network address (e.g. IP address).

During the registration process, a user sends a register message to the registrar server that includes its current location information (e.g., IP address). The registrar server (or location server) associates the user (e.g., its user domain name) with the location information. In some embodiments, intermediate servers (e.g., proxy servers) are positioned in the path between the user device and the registrar server. In other embodiments, a registrar server may physically reside at a proxy server and the only difference is logical. When the registrar or location server is physically remote from the proxy server, or when additional network elements are positioned in the path between the user client and registrar, the elements in the path simply forward the registration process messages between the client device and the registrar. These elements are referred to as "in-path" network devices or elements. These in-path devices may include any type of network device, including but not limited to a firewall, SIP firewall, SIP-aware network address translator (NAT) device, session border controller (SBC) device, any other type of back-to-back user agent (B2BUA), and the like.

Because of increased security concerns, networks are becoming more sophisticated, and more and more security devices, such as firewalls, are being utilized in the network. Because SIP is an end-to-end protocol, when SIP signaling from a source endpoint reaches the intended destination endpoint (a session is initiated), SIP specifies that further SIP signaling (occurring during the SIP session) flows directly between the two endpoints. As a result, any in-path security devices, such as a SIP firewalls, are excluded from the further SIP signaling path between the two endpoints.

Accordingly, there is needed a method and apparatus to ensure that in-path network security devices, such as SIP firewalls, remain in the signaling path during the entire communication session between the endpoints.

SUMMARY

In accordance with one embodiment of the present invention, there is provided a method of modifying a signaling message operable for ensuring one or more network devices remains in the signaling path between endpoints in a network. The method includes receiving a signaling message at a first network device from an originating endpoint device, the signaling message having a contact field comprising a first address identifying the originating endpoint device, storing the first address, generating and storing a hash identifier, and mapping the hash identifier to the first address. The received signaling message is modified at the first network device, the modified signaling message having a contact field comprising the hash identifier and a device identifier identifying the first network device, and the modified signaling message is transmitted to the second network device.

Furthermore, a computer program performing this method is embodied on a computer readable medium and operable to be executed by a processor or within a network device.

In accordance with yet another embodiment, there is provided a network device adapted to be placed in a communication path between an endpoint device and a proxy server in a network. The network device includes a network interface operable for receiving and transmitting one or more signaling messages and a memory, the memory adapted for storing data, and processing circuitry operable for processing received signaling messages. The network device is adapted to receive a signaling message from an originating endpoint device, the signaling message having a contact field comprising a first address identifying the originating endpoint device, store the first address, generate and store a hash identifier, and map the hash identifier to the first address. The network device is further adapted to modify the received signaling message, the modified signaling message having a contact field comprising the hash identifier and a device identifier identifying the network device, and transmit the modified signaling message to another network device.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 4 illustrates a method of transmitting a subsequent SIP request message in accordance with one embodiment of the present invention; and FIG. 5 illustrates method of transmitting a subsequent SIP signaling message in accordance with another embodiment of the present invention.

DETAILED DESCRIPTION

Figure 1:
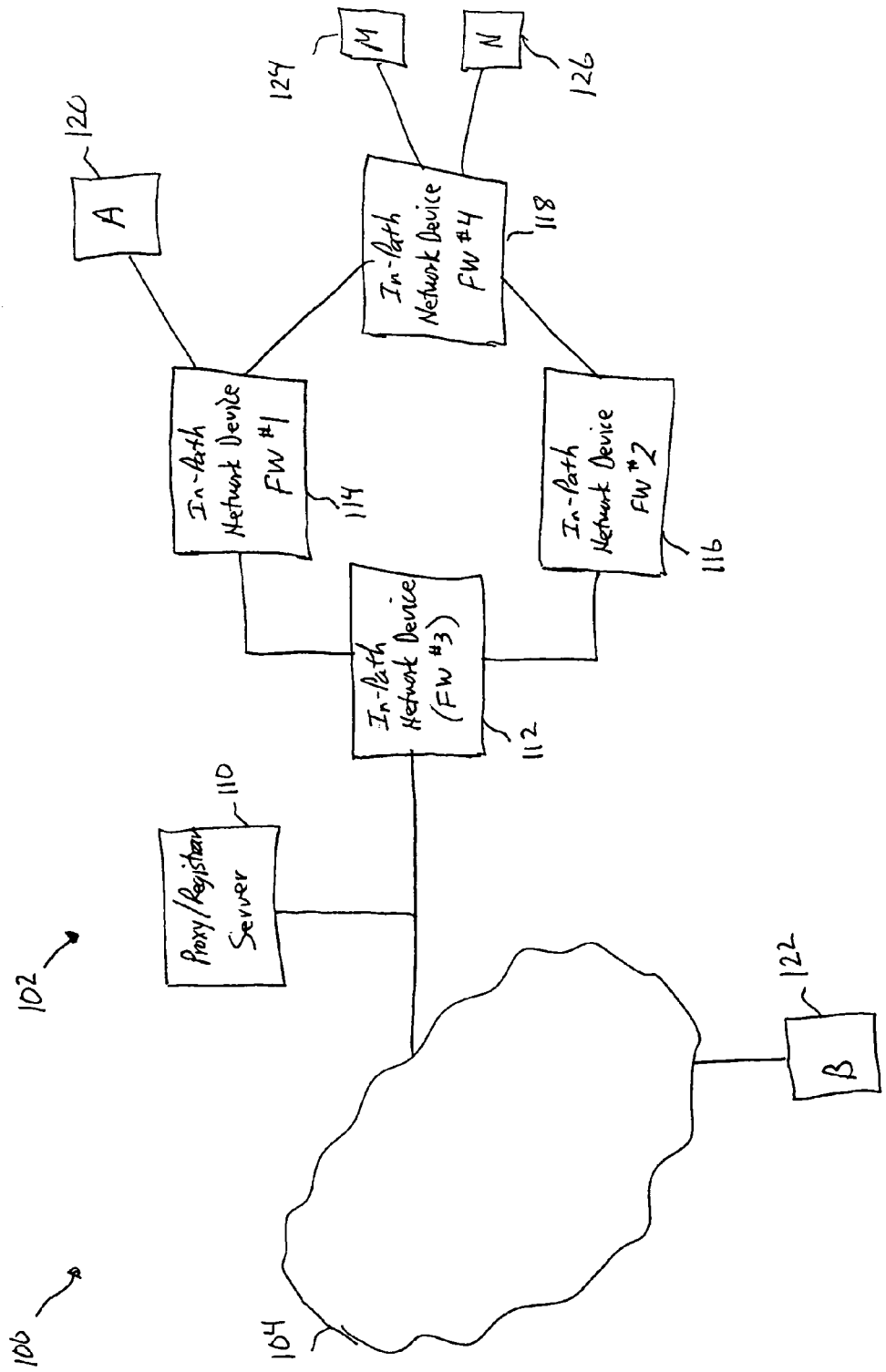
FIG. 1 illustrates a communications system or network in accordance with the present invention.

FIG. 1 illustrates an example data communications network or system 100 in accordance with the present invention. The system or network 100 shown in FIG. 1 is for illustration purposes only. Other embodiments of the system 100 may be used without departing from the scope of this disclosure.

In this example, the system 100 includes a portion of a network 102 (shown in dotted lines) and a network 104. As will be appreciated, the network 102 may form part of the network 104, or a gateway (not shown) or other coupling mechanism is provided to bridge the networks.

The networks 102 and 104 may further include one or more local area networks ("LAN"), metropolitan area networks ("MAN"), wide area networks ("WAN"), all or portions of a global network such as the Internet, or any other communication system or systems at one or more locations, or combination of these. Further, the network 102, 104 (and system 100) may include various servers, routers, bridges, and other access and backbone devices. In one embodiment, the network 102 is a packet network that utilizes any suitable protocol or protocols, and in a specific embodiment, the networks 102 and/or 104 (and most components connected thereto) operate in accordance with the Session Initiation Protocol (SIP). As will be appreciated, the concepts and teachings of the present invention may not be necessarily limited to SIP, but may be utilized in any data packet network that facilitates communication between components of the data networks 102 and/or 104 (or within system 100), including Internet Protocol ("IP") packets, frame relay frames, Asynchronous Transfer Mode ("ATM") cells, or other data packet protocols, in which it is desirable to maintain certain network elements (in-path) within a given communications path between two endpoints.

As will be appreciated, other components and networks may be included in the system 100, and FIG. 1 only illustrates but one exemplary configuration to assist in describing the operation of the present invention to those skilled in the art. However, for ease of understanding and clarity, the present invention will be described illustratively by using elements operating in accordance with SIP.

The network 102 (and network 104) includes a SIP proxy server 110, four in-path network devices, such as SIP firewalls, 112, 114, 116, 118, and a plurality of user client or endpoint devices (or user agents) 120, 122, 124, 126 (also identified using the references A, B, M and N, respectively). The endpoint device 122 is shown coupled to the network 104. The SIP proxy server 110 is shown as also including SIP registrar functionality (however, registrar functionality may be provided by a separate server and registration database). As will be appreciated, these elements are communicatively coupled to each other via one or more communications networks or lines.

It will be understood that additional endpoints (user client devices or user agents) may be included within the system 100, and the endpoint devices 120, 122, 124, 126 represent any devices that may be communicatively coupled to a data network, including but not limited to phones, computers, modems, PDAs, routers, switches, or any other network devices and the like. The endpoint devices 120, 122, 124, 126 may be constructed or configured from any suitable hardware, software, firmware, or combination thereof for transmitting or receiving information over a network.

The network devices 112, 114, 116, 118 may be a server or other network device of any type or functionality. However, in the example shown, the devices 112, 114, 116, 118 are SIP firewalls. In accordance one aspect of the present invention, these devices 112, 114, 116, 118 are usually network device(s) that are within, or on, the communications path between two (or more) endpoints engaging in a communication session (or desired to be within the path). Thus, these devices are links in the path. In one specific embodiment, in the example shown in FIG. 1, the devices 112, 114, 116, 118 are SIP firewalls positioned at a predetermined position in the system 100. Each device 112, 114, 116, 118 may be constructed or configured from any suitable hardware, software, firmware, or combination thereof for transmitting or receiving information over a network, including a processor, memory for storing data, additional logic circuitry, interface circuitry, software/firmware, etc.

Figure 2:
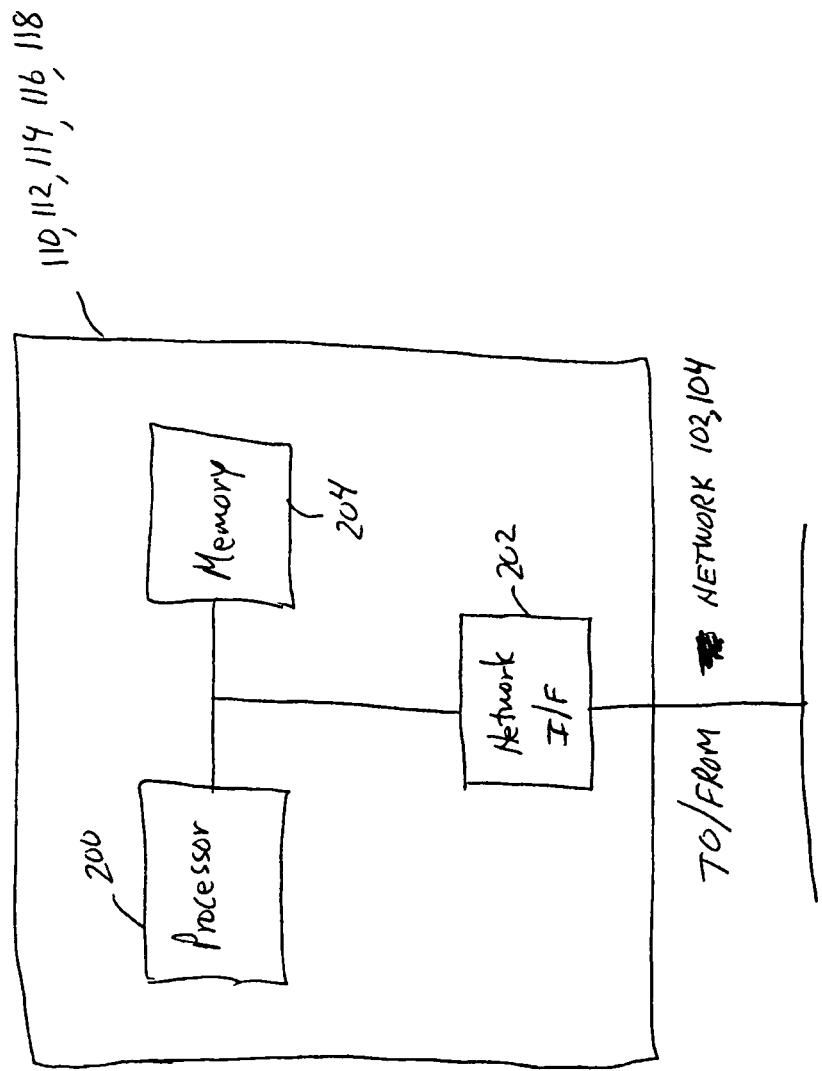
FIG. 2 is a block diagram of an in-path network device of FIG. 1.

Now referring to FIG. 2, there is shown one embodiment of the basic elements of the SIP firewalls 112, 114, 116, 118. In this embodiment, the devices 112, 114, 116, 118 include a processor 200, a network interface 202 and memory 204. The processor 200 provides management, control and processing functionality. The network interface 202 is operable for receiving/transmitting data from/to a data network. The memory 204 is operable for storing data. The proxy server 110 is constructed of similar elements. Software/firmware and other circuitry may be provided for performing the functionality described herein, and for providing the overall desired functionality (e.g., firewall, proxy server) of the devices.

In general terms, SIP signaling message(s) transmitted from a source endpoint are modified by in-path devices as the message(s) progress through such in-path devices towards a destination device. In one embodiment, SIP Contact information in the message for each hop is modified to uniquely identify the in-path device(s) to the next hop device. This ensures that the in-path device(s) remain in the signaling path between endpoints during a given communication session.

The general operation of one embodiment of the present invention will now be described with reference to FIG. 1. Assume that the endpoint device 120 (e.g., UserA@example1.com, with IP address 10.1.1.1) desires to establish a SIP communication session with the endpoint device 122 (e.g., UserB@example2.com). An INVITE message addressed to Request-URI sip:UserB@example2.com is transmitted from User A and directed to the SIP proxy/registrar server 110, which is received by the SIP firewall 114 (also referred to as FW1). In the prior art, the SIP firewall 114 would forward the original INVITE message intact to the next hop device, the SIP firewall 112 (also referred to as FW3), which would then forward it onward to the proxy server 110. In accordance with the present invention, the original INVITE message received at the SIP firewall 114 is modified prior to forwarding to the SIP firewall 112. The modified INVITE message is transmitted or forwarded to the next hop device, in this case, the SIP firewall 112. Similarly, the modified INVITE message received at the SIP firewall 112 is again modified prior to forwarding to the proxy server 110.

In particular, the Contact field of the INVITE message, which originally included "UserA@10.1.1.1:Port#", is modified by the SIP firewall 114 using the generic form "UserA@FW1IP:FW1Port x-yy-contact-param <FW1-hash:FW1ID>", where FW1IP is the IP address of the SIP firewall 114, FW1Port is the SIP listening port of the SIP firewall 114, FW1-hash is a hash number generated by the SIP firewall 114 uniquely for the endpoint device 120 (based on User A's IP address, and the Port#, if used), and FW1ID is a unique identifier for the SIP firewall 114. The firewall device identifying scheme may utilize MAC addresses or other methods to uniquely identify the firewalls 112, 114, 116, 118 in the network 102. When the SIP firewall 114 receives the original INVITE message, it produces a hashing identifier (FW1-hash) that is mapped to the endpoint device 120 (User A). It also stores the address of the device 120 and the hashing identifier, and maps the hash identifier to that address. The SIP firewall 114 stores a FW1-hash to UserA@10.1.1.1:Port# mapping for the endpoint 120 (User A).

The modified INVITE message is transmitted/forwarded to the SIP firewall 112. When the modified INVITE message is received at the SIP firewall 112, it is similarly modified. In particular, the Contact field of the received modified INVITE message, which included "UserA@FW1IP:FW1Port x-yy-contact-param <FW1-hash:FW1ID>", is modified by the SIP firewall 112 into the generic form "UserA@FW3IP:FW3Port x-yy-contact-param <FW1-hash:FW1ID>", where FW3IP is the IP address of the SIP firewall 112, FW3Port is the SIP listening port of the SIP firewall 112, FW1-hash is the hash number generated by the SIP firewall 114 uniquely for the endpoint device 120 (User A), and FW1ID is a unique identifier for the SIP firewall 114. Additionally, the SIP firewall 112 maintains a mapping table for FW1ID and stores a FW1-hash to FW1IP:FW1Port mapping to identify the SIP firewall 114 as the next hop from the SIP firewall 112 for subsequent request signaling messages from the endpoint 122 (User B).

Additional tables for other downstream SIP firewalls, such as SIP firewall 116 (FW2ID), would also be maintained having a FWX-hash mapping to FWXIP:FWXPort. This properly identifies the next device in the path in the event that there are two possible downstream devices that may be in the path. Moreover, it will be understood that the mapping table for FW1ID (within the firewall 112) will likely include multiple hash identifiers all pointing to FW1IP:FW1Port, while the mapping table stored in the firewall 114 will likely include multiple hash identifiers—one for each active coupled endpoint device.

The modified INVITE message is then transmitted/forwarded to the proxy server 110. The proxy server resolves the IP address for the endpoint 122 (User B) and sends the modified INVITE message to the endpoint 122. As will be appreciated, the INVITE message forwarded to the endpoint device 122 includes in its Contact field "UserA@FW3IP:FW3Port x-yy-contact-param <FW1-hash:FW1ID>" which identifies the SIP firewall 112 as the end user contact point to the endpoint 122 (User B). The SIP process proceeds conventionally from the proxy server 110 to the destination endpoint 122 (User B), which may include a proxy server for User B and additional network devices within the network 104.

It will be understood that, within SIP, responses (e.g., 200 "OK" message) to signaling requests will flow conventionally, pursuant to the Via header information (of the request message, e.g., INVITE message) as modified by each network device in the path. Responses will follow the previous signaling path through each of the in-path network devices.

In one embodiment, a response signaling message (e.g., 200 "OK" message) from the endpoint device 122 (User A) is transmitted along the path followed by the previous request signaling message. This response follows the path specified in the Via header information. The Contact field of the response further includes contact information, such as UserB@IPaddress:Port#, of the endpoint device 122 (User B).

When the response reaches the SIP firewall 112, the Contact field of the response message is modified, in a similar fashion as was done with the original request signaling message from the endpoint device 120 (User A). The modified response message is transmitted onward to the SIP firewall 114 where it is again modified, and forwarded to the endpoint device 120 (User A).

More specifically, the Contact field of the response message, which originally included "UserB@IPAddress:Port#", is modified by the SIP firewall 112 using the generic form "UserB@FW3IP:FW3Port x-yy-contact-param <FW3-hash:FW3ID>", where FW3IP is the IP address of the SIP firewall 112, FW3Port is the SIP listening port of the SIP firewall 112, FW3-hash is a hash number generated by the SIP firewall 112 uniquely for the endpoint device 122 (based on User B's IP address, and the Port#, if used), and FW3ID is a unique identifier for the SIP firewall 112. When the SIP firewall 112 receives the response message, it produces a hashing identifier (FW3-hash) that is mapped to the endpoint device 122 (User B). It also stores the address of the device 122 and the hashing identifier, and maps the hash identifier to that address. The SIP firewall 112 stores a FW3-hash to UserB@IPAddress:Port# mapping for the endpoint 122 (User B).

The modified response message is transmitted/forwarded to the SIP firewall 114. When the modified response message is received at the SIP firewall 114, it is similarly modified. In particular, the Contact field of the received modified response message, which included "UserB@FW3IP:FW3Port x-yy-contact-param <FW3-hash:FW3ID>", is modified by the SIP firewall 114 into the generic form "UserB@FW1IP:FW1Port x-yy-contact-param <FW3-hash:FW3ID>", where FW1IP is the IP address of the SIP firewall 114, FW1Port is the SIP listening port of the SIP firewall 114, FW3-hash is the hash number generated by the SIP firewall 112 uniquely for the endpoint device 122 (User B), and FW3ID is a unique identifier for the SIP firewall 112. Additionally, the SIP firewall 114 maintains a mapping table for FW3ID and stores a FW3-hash to FW3IP:FW3Port mapping to identify the SIP firewall 112 as the next hop from the SIP firewall 114 for subsequent request signaling messages from the endpoint 120 (User A).

As will be appreciated, the response message forwarded to the endpoint device 120 (User A) includes in its Contact field "UserB@FW1IP:FW1Port x-yy-contact-param <FW3-hash:FW3ID>" which identifies the SIP firewall 114 as the end user contact point to the endpoint 120 (User A).

The SIP process proceeds conventionally and a media session is set up between the endpoint devices 120, 122 (User A, User B). Typically, the media session flows directly between the two endpoints, with no intermediate or in-path devices between them (except for conventional routing devices in the path). During the media session, or at other times during the call session (or setup), a new request signaling message may be generated and transmitted from the original destination endpoint to the original source endpoint or from the original source endpoint to the original destination endpoint. Such a new request message may operably request additional, different or modified capabilities for the media session, such as changing the CODEC, adding a different service or changing parameters to the existing session, between the two endpoints. This may also include modification of the Contact field's IP address and/or port. As noted previously, it may be desirable to ensure that certain in-path network devices (e.g., FW1, FW3) remain the path of the transmitted signaling request.

It will be understood that in other embodiments, it may be desirable for the media session to flow through the intermediate or in-path network devices (e.g., FW1, FW3) by utilizing the user contact information obtained from the Contact field in a modified INVITE message and/or modified response message. In other embodiments, it may be desirable for any subsequent request message to flow through the intermediate or in-path or in-network devices (e.g., FW1, FW3).

As a result of receiving the modified INVITE message, the endpoint 122 (User B) "sees" the SIP firewall 112 (FW3) as the contact point for the session and will direct any subsequent new signaling request messages generated by the endpoint device 122 (User B) to "UserA@FW3IP:FW3Port x-yy-contact-param <FW1-hash:FW1ID>". In other words, the User A Contact has been modified to be the SIP firewall 112 (FW3).

As a result of receiving the modified response message, the endpoint 120 (User A) "sees" the SIP firewall 114 (FW1) as the contact point for the session and will direct any subsequent new signaling request messages generated by the endpoint device 1202 (User A) to "UserB@FW1IP:FW1Port x-yy-contact-param <FW3-hash:FW3ID>". In other words, the User B Contact has been modified to be the SIP firewall 114 (FW1).

Subsequent requests may be made by the endpoint device 122 (User B) during the current session. Upon receipt of a new request message, such as a re-INVITE message (or UPDATE, BYE) from the endpoint device 122 (User B), the SIP firewall 112 utilizes the FW1-hash:FW1ID information (previously obtained by receipt of the original INVITE message) therein and determines where to send the re-INVITE message. As described previously, the SIP firewall 112 maintains a look-up table for FW1ID, which includes a mapping for FW1-hash—resolved to FW1IP:FW1Port.

The re-INVITE message, which originally included "UserA@FW3IP:FW3Port x-yy-contact-param <FW1-hash:FW1ID>" as the addressee, is modified by the SIP firewall 112 to "UserA@FW1IP:FW1Port x-yy-contact-param <FW1-hash:FW1ID>". The modified re-INVITE message is transmitted/forwarded to the SIP firewall 114. Upon receipt of the modified re-INVITE message from the SIP firewall 112, the SIP firewall 114 utilizes the FW1-hash information therein and determines where to send the re-INVITE message. As described previously, the SIP firewall 114 maintains a mapping or lookup table for FW1-hash, which includes a mapping to the endpoint device 120 (User A)—resolved to 10.1.1.1:Port. When the modified re-INVITE message is received at the SIP firewall 114, it is similarly modified. In particular, the addressee field of the received modified re-INVITE message, which included "UserA@FW1IP:FW1Port x-yy-contact-param <FW1-hash:FW1ID>", is modified by the SIP firewall 114 to include at least "UserA@10.1.1.1:Port".

This ensures the in-path devices (e.g., SIP firewalls 112, 114) remain in the signaling path between the endpoints for subsequent request messages originating from the endpoint 122 (User B) relating to the session.

In such a subsequent request message from User B, as described above, the addressee field is typically the Request-URI SIP header which is modified to change the addressee information (to reach User A). In addition, the Contact field related to User B will usually also be modified (as described previously).

Other subsequent requests may be made by the endpoint device 120 (User A) during the current session. Upon receipt of a new request message, such as an UPDATE message (or BYE, re-INVITE) from the endpoint device 120 (User A), the SIP firewall 114 utilizes the FW3-hash:FW3ID information (previously obtained by receipt of the original response message) and determines where to send the UPDATE message. As described previously, the SIP firewall 114 maintains a look-up table for FW3ID, which includes a mapping for FW3-hash—resolved to FW3IP:FW3Port.

The UPDATE message, which originally included "UserB@FW1IP:FW1Port x-yy-contact-param <FW3-hash:FW3ID>" as the addressee, is modified by the SIP firewall 114 to "UserB@FW3IP:FW3Port x-yy-contact-param <FW3-hash:FW3ID>". The modified UPDATE message is transmitted/forwarded to the SIP firewall 112. Upon receipt of the modified UPDATE message from the SIP firewall 114, the SIP firewall 112 utilizes the FW3-hash information therein and determines where to send the UPDATE message. As described previously, the SIP firewall 112 maintains a mapping or lookup table for FW3-hash, which includes a mapping to the endpoint device 122 (User B)—resolved to IPAddress:Port (of User B). When the modified UPDATE message is received at the SIP firewall 112, it is similarly modified. In particular, the addressee field of the received modified UPDATE message, which included "UserB@FW3IP:FW3Port x-yy-contact-param <FW3-hash:FW3ID>", is modified by the SIP firewall 112 to include at least "UserB@IPAddress:Port".

This ensures the in-path devices (e.g., SIP firewalls 112, 114) remain in the signaling path between the endpoints for subsequent request messages originating from the endpoint 120 (User A) relating to the session.

In such a subsequent request message from User A, as described above, the addressee field is typically the Request-URI SIP header which is modified to change the addressee information (to reach User B). In addition, the Contact field related to User A will usually also be modified (as described previously).

Any further subsequent signaling request messages originated or generated by the endpoint device 120 (User A) or the endpoint device 122 (User B) related to the session follow the same given path (through FW1 and FW3). This is described more fully with respect to FIGS. 4 and 5, below. The Contact information in the subsequent request messages (and if necessary, any subsequent response messages) may also be modified by the SIP firewalls 114, 112 similarly to the original request message modifications (and original response messages), as described above. However, this may not be necessary as the Contact address for each endpoint device (120, 122) is known by the other after an initial request/response exchange.

As will be appreciated, various descriptions of the operation of the invention in different scenarios (i.e., using different network configurations, numbers of in-path devices, different endpoints, such as endpoint devices 124, 126) are within the understanding of those skilled in the art, and the concepts and teachings of the example described above (between User A and User B) can be applied.

Figure 3:
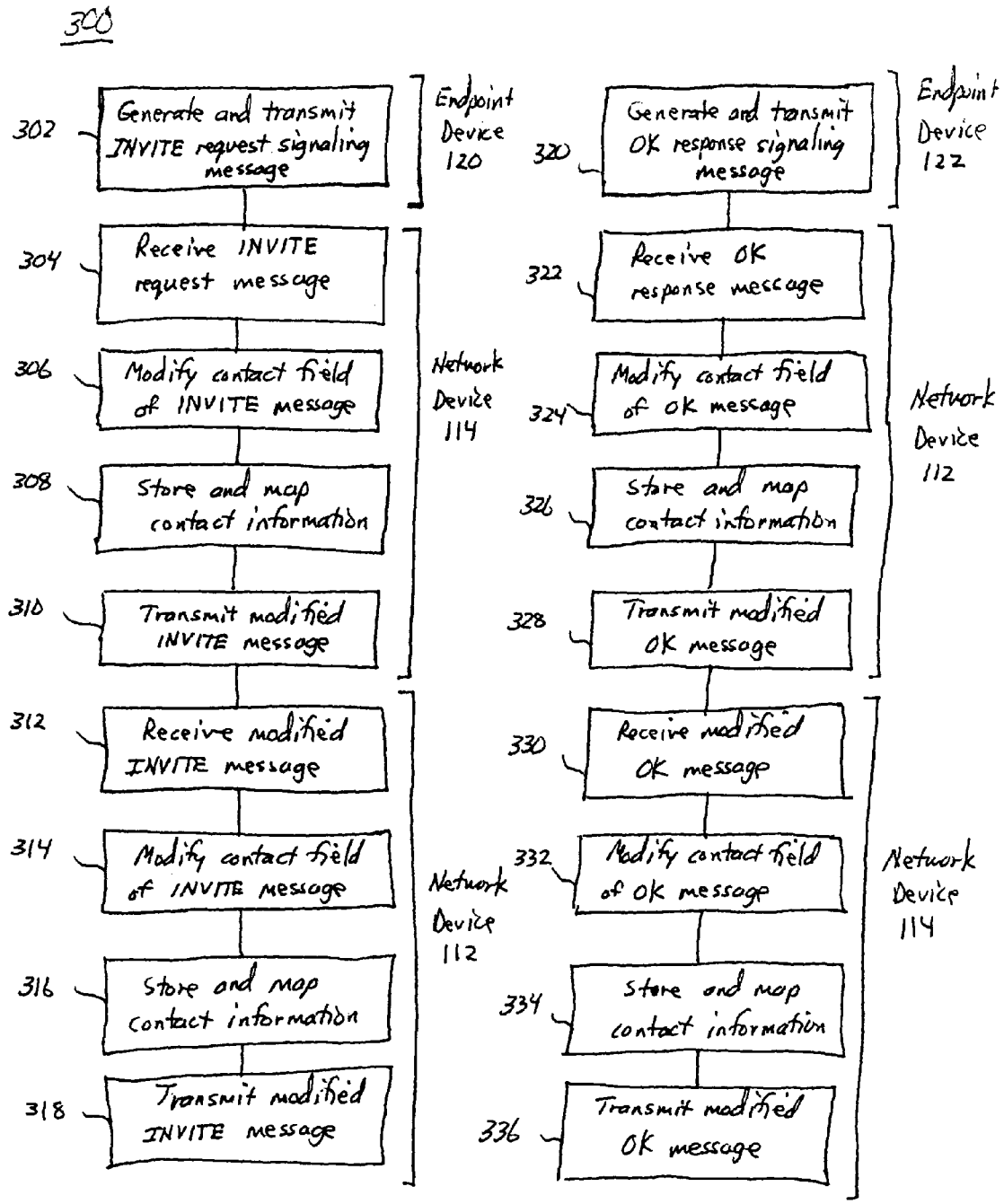
FIG. 3 illustrates a method of modifying SIP signaling messages in accordance with one embodiment of the present invention.

Now referring to FIG. 3 (and with continued reference to FIG. 1) there is described a method 300 of modifying SIP signaling messages to ensure that one or more in-path devices remain in the signaling path for endpoints.

The endpoint device 120 generates and transmits a SIP request signaling message, such as an INVITE message, to its corresponding proxy server 110 (step 302). The in-path network device, such as the SIP firewall 114, receives the signaling message from the endpoint device 120 (step 304). The SIP firewall 114 makes one or more modifications to the Contact field within the received original INVITE message (step 306). The original IP address (identifying the IP address of the endpoint device 120) is substituted or replaced with the IP address (FW1IP:FW1Port) of the SIP firewall 114. Additional information is added to the Contact field which includes a unique designation (FW1ID) identifying the SIP firewall 114 (usually something other than the IP address of the SIP firewall, though it may be the IP address) and a unique hash identifier (FW1-hash) for identifying the endpoint device 120 to the SIP firewall 114. The endpoint device 120 Contact information is stored and mapped to the unique hash identifier (step 308). The modified signaling message is then transmitted to the SIP firewall 112 (next hop in-path device towards the proxy server) (step 310).

The SIP firewall 112 receives the signaling message from the SIP firewall 114 (step 312). The SIP firewall 112 makes one or more modifications to the Contact field within the received modified INVITE message (step 314). The IP address (FW1IP:FW1Port) within the Contact field of the received modified INVITE message (identifying the IP address of the SIP firewall 114) is substituted or replaced with the IP address (FW3IP:FW3Port) of the SIP firewall 112. The SIP firewall 112 maintains a table corresponding to the unique identifier (FW1ID) for the SIP firewall 114 and stores therein a mapping between the unique hash identifier (FW1-hash) within the Contact field and the IP address (FW1IP:FW1Port) of the SIP firewall 114 (step 316). The modified signaling message is then transmitted to the next in-path device which, in the example illustrated in FIG. 1, is the proxy server 110 (step 318).

Though not shown in FIG. 1, the proxy server resolves the IP address for the endpoint 122 (User B) and forwards the modified INVITE message toward the endpoint 122. The forwarded INVITE message includes in its Contact field "UserA@FW3IP:FW3Port x-yy-contact-param <FW1-hash:FW1ID>" which identifies the SIP firewall 112 as the end user contact point to the endpoint 122 (User B). The SIP process proceeds and a media session is established between the two endpoints 120, 122. Response messages flow in accordance with Via header information of the INVITE message(s).

In one embodiment, the response signaling messages flow as described hereinafter.

The endpoint device 122 (User B) transmits a response signaling message (e.g., 200 "OK" message) intended ultimately for the endpoint device 120 (User A) to the SIP firewall 112 (step 320). The 200 "OK" response message follows the path specified in the Via header. This 200 "OK" response message includes in its Contact field, the Contact information for the endpoint device 122 (User B) such as UserB@IPAddress. When the SIP firewall 112 receives the SIP 200 "OK" response message (step 322), the SIP firewall 112 makes one or more modifications to the Contact field within the received 200 "OK" message (step 324). The original IP address (identifying the IP address of the endpoint device 120) is substituted or replaced with the IP address (FW3IP:FW3Port) of the SIP firewall 112. Additional information is added to the Contact field which includes a unique designation (FW3ID) identifying the SIP firewall 112 and a unique hash identifier (FW3-hash) for identifying the endpoint device 122 to the SIP firewall 112. The endpoint device 122 Contact information is stored and mapped to the unique hash identifier (step 326). The modified response message is then transmitted to the SIP firewall 114 (next hop in-path device) (step 328).

The SIP firewall 114 receives the response message from the SIP firewall 112 (step 330). The SIP firewall 114 makes one or more modifications to the Contact field within the received modified 200 "OK" message (step 332). The IP address (FW3IP:FW3Port) within the Contact field of the received modified 200 "OK" message (identifying the IP address of the SIP firewall 112) is substituted or replaced with the IP address (FW1IP:FW1Port) of the SIP firewall 114. The SIP firewall 114 maintains a table corresponding to the unique identifier (FW3ID) for the SIP firewall 112 and stores therein a mapping between the unique hash identifier (FW3-hash) within the Contact field and the IP address (FW3IP:FW3Port) of the SIP firewall 112 (step 334). The modified response message is then transmitted to the endpoint device 120 (User A) (step 336).

Now referring to FIG. 4 (and with continued reference to FIG. 1) there is described a method 400 for transmitting a subsequent SIP request signaling message from the endpoint device 122 (the original destination endpoint for the session) to the endpoint device 120 (the original source endpoint for the session) to ensure that one or more in-path devices (e.g., 112, 114)) remain in the signaling path between the endpoints.

Based on Contact information in the previously received modified INVITE message (received from the SIP firewall 112), the endpoint device 122 (User B) transmits a subsequent SIP request signaling message (e.g., UPDATE message) intended ultimately for the endpoint device 120 (User A) to the SIP firewall 112 (step 420). This is accomplished by addressing/sending the SIP request message to the Contact identified in the previously received INVITE message for that session (UserA@FW3IP:FW3Port x-yy-contact-param <FW1-hash:FW1ID). The SIP firewall 112 receives the SIP request message (step 422). From information in the received request signaling message, particularly the device ID information (e.g., FW1ID), the SIP firewall 112 looks up the table mapping for FW1ID and determines the IP address (FW1IP:FW1Port) of the next hop device (step 424). The received request signaling message is addressed/sent to the determined IP address (FW1IP:FW1Port) of the SIP firewall 114, and includes both the hash identifier (FW1-hash) and the device ID (FW1ID) (step 426). The request signaling message is transmitted to the SIP firewall 114.

The SIP firewall 114 then receives the request signaling message from the SIP firewall 112 (step 428). From information in the message, particularly the unique hash identifier (FW1-hash)), the SIP firewall 114 looks up the mapping for FW1-hash and determines the address (UserA@10.1.1.1) of the endpoint device 120 (step 430). The received request signaling message is addressed/sent to the determined address (UserA@10.1.1.1) of the endpoint device 120 (step 432). The request message is transmitted to the endpoint device 120.

It will be understood that because the message is a new SIP request message, in one embodiment, the Contact field of the message may also be modified by the devices 112, 114 as the message flows through this path—similar to the process described for the first INVITE message.

Now referring to FIG. 5 (and with continued reference to FIG. 1) there is described a method 500 for transmitting a subsequent SIP request signaling message from the endpoint device 120 (the original source endpoint for the session) to the endpoint device 122 (the original destination endpoint for the session) to ensure that one or more in-path devices (e.g., 112, 114)) remain in the signaling path between the endpoints.

Based on Contact information in the previously received response 200 "OK" message (received from the SIP firewall 114), the endpoint device 120 (User A) transmits a subsequent SIP request signaling message (e.g., re-INVITE message) intended ultimately for the endpoint device 122 (User B) to the SIP firewall 114 (step 520). This is accomplished by addressing/sending the SIP request message to the Contact identified in the previously received response message for that session (UserB@FW1IP:FW1Port x-yy-contact-param <FW3-hash:FW3ID). The SIP firewall 114 receives the SIP request message (step 522). From information in the received request signaling message, particularly the device ID information (e.g., FW3ID), the SIP firewall 114 looks up the table mapping for FW3ID and determines the IP address (FW3IP:FW3Port) of the next hop device (step 524). The received request signaling message is addressed/sent to the determined IP address (FW3IP:FW3Port) of the SIP firewall 112, and includes both the hash identifier (FW3-hash) and the device ID (FW3ID) (step 526). The request signaling message is transmitted to the SIP firewall 112.

The SIP firewall 112 then receives the request signaling message from the SIP firewall 114 (step 528). From information in the message, particularly the unique hash identifier (FW3-hash)), the SIP firewall 112 looks up the mapping for FW3-hash and determines the address (UserB@IPAddress) of the endpoint device 122 (step 530). The received request signaling message is addressed/sent to the determined address (UserB@IPAddress) of the endpoint device 122 (step 434). The request message is transmitted to the endpoint device 122.

It will be understood that because the message is a new SIP request message, in one embodiment, the Contact field of the message may also be modified by the devices 114, 112 as the message flows through this path—similar to the process described for the first INVITE message.

One advantage of the processes and apparatus described herein is that a single port on each network device (e.g., 112, 114, 116, 118) may be utilized. The generated hash uniquely identifies each user, instead of opening separate/multiple ports on the network device when multiple devices are attached. Thus, the hash functions as a multiplexer in place of using multiple ports. For example, the SIP firewall device 118 includes two endpoints 124, 126, as shown. In accordance with one aspect of the present invention, the firewall device 118 generates a unique hash for each endpoint device 124, 126. The firewall device 118 listens on a single port (instead of multiple ports—one for each endpoint device) and differentiates between the endpoint devices 124, 126 by generating a unique hash for each. Thus, the network device in the path connected to the endpoint devices generates the unique hash for each endpoint device. The generated hash uniquely identifies the endpoint device on the network, and is a globally routable Contact. The mapping used by the in-path devices further functions as routing logic.

It will be understood that in the example shown, there is shown only two in-path devices between the endpoint device 120 and the proxy server 110. Fewer or additional devices may be in the path. If additional devices are in the path, such as between the SIP firewall 112 and the proxy server 110, then the SIP firewall 112 will modify the Contact field or Request-URI (dependent on the origination device and timing of any request message) similarly, as described herein.

It further be understood that the steps identified herein may not be required to be performed in any specific order, and that all steps may not be required or necessary, and additional steps or actions may be included in the methods 300, 400, 500.

In one embodiment, the Contact information and mapping information is maintained by the network devices beyond the dialog context duration for use in de-modifying the Contact information for the REFER SIP method (or similar methods).

In general terms, the present invention provides an algorithm or method for use within one or more in-path network devices for modifying SIP Contact information (within a SIP signaling message) to ensure that the in-path network devices remain in the signaling path between endpoints for subsequent signaling messages (e.g., requests). In other words, when a path is established between an endpoint device and its proxy server, signaling messages may traverse through "in-path" network devices before reaching the proxy server (or endpoint device). In some cases, these in-path network devices provide security functions, such as a SIP firewall, and there may be more than one in the path. As a result, it is desirable for all SIP signaling between the endpoints to flow through the SIP firewalls (or at least certain ones) in the signaling path between the endpoints—even during or after the media session is established.

Contact information in the SIP signaling messages is modified at each in-path network device during the signaling process (along with storage of mapping information) to allow the in-path network devices to identify the next (and previous) hop device in the path for subsequent signaling messages generated from the destination endpoint, and thus, remember the initial path taken by signaling messages early on during the signaling process. As a result, all subsequent signaling messages transmitted during the session follow this path, which ensures that the in-path network devices remain in the SIP signaling path.

More specifically, the first network device 114 in line to the endpoint device 120 maintains routing information of the endpoint device 120. To maintain an efficient lookup, the network device 114 maps each endpoint device (or user) 120 to a unique hash-id. To identify the network device 114 within the network, the network device 114 utilizes a unique device identity tag to distinguish itself within the network. The Contact information of the endpoint device 120 is modified by the network device 114 using the "other param" header of the SIP Contact field to include the unique hash-id and unique device identity tag. Thus, the signaling message is modified and sent onward. Other network devices in the path, such as the network device 112, will examine the Contact information. If it includes the "other param" with information, the network device 112 will modify the Contact field with its own IP address, and maintain the unique hash-id and unique device identity tag of the device 114, if necessary, to maintain Contact replacement mapping to the previous network device 114.

The concepts and teachings of the present invention are not limited to SIP signaling, which is but one embodiment, but may be used in other systems utilizing an end-to-end protocol, including H.323, etc.

In some embodiments, certain functions and methods performed by the in-path network devices 112, 114, 116, 118

(as well as the proxy server 110) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. In this document, the term "couple," "connect" and their derivatives refer to any direct or indirect communication between two or more elements, whether or not those elements are in physical contact with one another.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of modifying a signaling message between an originating endpoint device and a destination endpoint device in a network, the method comprising:
   receiving a first signaling message at a first network device from the originating endpoint device, the first signaling message corresponding to a communication session between the originating endpoint device and the destination endpoint device, and having a contact field comprising a first address identifying the originating endpoint device;
   storing the first address;
   generating and storing a hash identifier;
   mapping the hash identifier to the first address;
   generating, at the first network device a second signaling message comprising the first signaling message having a modified contact field comprising the hash identifier and a second address identifying the first network device as a contact point to the destination endpoint device; and
   transmitting the second signaling message to a second network device;
   receiving a third signaling message at the first network device from the second network device, the third signaling message including the second address and the hash identifier;
   determining the first address from the received has identifier; and
   transmitting the third signaling message to the originating endpoint device.

2. The method in accordance with claim 1 wherein the first signaling message and the second signaling message are Session Initiation Protocol (SIP) signaling messages.

3. The method in accordance with claim 2 wherein the first signaling message and the second signaling message are each INVITE messages.

4. The method in accordance with claim 1 wherein the second address identifying the first network device comprises a network address of the first network device.

5. The method in accordance with claim 4 wherein the first signaling message is a Session Initiation Protocol (SIP) signaling message, and the first network device is a SIP firewall device.

6. The method in accordance with claim 1 further comprising:
   receiving the second signaling message at the second network device from the first network device;
   generating at the second network device a third signaling message having a contact field comprising a third address identifying the second network device as the contact point to the destination endpoint device, the second address at the second signaling message, and the hash identifier at the second signaling message; and
   transmitting the third signaling message to a third network device.

7. The method in accordance with claim 1 further comprising:
   receiving a third signaling message at the first network device from the second network device, the third signaling message having a contact field comprising a third address identifying the second network device;
   storing the third address;
   generating and storing a second hash identifier;
   mapping the second hash identifier to the third address;
   generating at the first network device, a fourth signaling message comprising the third signaling message having a modified contact field comprising the second hash identifier and a fourth address identifying the first network device; and
   transmitting the fourth signaling message to the originating endpoint device.

8. The method in accordance with claim 7 wherein the first signaling message comprises a SIP request message and the third signaling message comprises a SIP response message.

9. The method in accordance with claim 7 further comprising:
   receiving a fifth signaling message at the first network device from the originating endpoint device, the fifth signaling message including the fourth address and the second hash identifier;
   determining the third address from the received second hash identifier; and
   transmitting a sixth signaling message to the second network device.

10. The method in accordance with claim 9 wherein the first signaling message comprises a SIP request message, the third signaling message comprises a SIP response message, and the fifth signaling message comprises a subsequent SIP request message.

11. The method in accordance with claim 1 wherein the first signaling message comprises a SIP request message and the third signaling message comprises a subsequent SIP request message.

12. The method in accordance with claim 1 further comprising:
   receiving a third signaling message at the first network device from the second network device, the third signaling message including the second address and the hash identifier;

determining the first address from the received hash identifier;

generating, at the first network device, to a fourth signaling message comprising the third signaling message including the first address identifying the originating endpoint device; and transmitting the fourth signaling message to the originating endpoint device.

13. A network device configured to be placed in a communication path between an endpoint device and a proxy server in a network, the network device comprising:

a network interface configured to receive and transmit one or more signaling messages;

a memory configured to store data;

processing circuitry configured to process received signaling messages; and wherein the network device is configured to:

receive a first signaling message from an originating endpoint device, the first signaling message corresponding to a communication session between the originating endpoint device and a destination endpoint device, and having a contact field comprising a first address identifying the originating endpoint device;

store the first address;

generate and store a hash identifier;

map the hash identifier to the first address;

modify the received first signaling message to generate a second signaling message comprising the second first signaling message having a modified contact field comprising the hash identifier and a second address identifying the network device as a contact point to the destination endpoint device;

transmit the second signaling message to another network device;

receive a third signaling message at the network device from another network device, the third signaling message including the second address and the hash identifier;

determine the first address from the received hash identifier; and transmit the third signaling message to the originating endpoint device.

14. The network device in accordance with claim 13 wherein the first signaling message and the second signaling message are Session Initiation Protocol (SIP) signaling messages.

15. The network device in accordance with claim 13 wherein the first signaling message and the second signaling message are each INVITE messages.

16. The network device in accordance with claim 13 wherein the network device is further configured to:

receive a third signaling message at the network device from another network device, the third signaling message having a contact field comprising a third address identifying another network device;

store the third address;

generate and store a second hash identifier;

map the second hash identifier to the third address;

generate, at the network device, to generate a fourth signaling message comprising the third signaling message having a modified contact field comprising the second hash identifier and a fourth address identifying the network device; and transmit the fourth signaling message to the originating endpoint device.

17. The network device in accordance with claim 16 wherein the first signaling message comprises a Session Initiation Protocol (SIP) request message and the third signaling message comprises a SIP response message.

18. The network device in accordance with claim 16 wherein the network device is further configured to:

receive a fifth signaling message at the network device from the originating endpoint device, the fifth signaling message including the fourth address and the second hash identifier;

determine the third address from the received second hash identifier; and transmit a sixth signaling message to another network device.

19. The network device in accordance with claim 18 wherein the first signaling message comprises a Session Initiation Protocol (SIP) request message, the third signaling message comprises a SIP response message, and the fifth signaling message comprises a subsequent SIP request message.

20. The method in accordance with claim 13 wherein the network device is further configured to:

receive a third signaling message at the network device from another network device, the third signaling message including the second address and the hash identifier;

determine the first address from the received hash identifier; and transmit the third signaling message to the originating endpoint device.

21. The network device in accordance with claim 13 wherein the first signaling message comprises a Session Initiation Protocol (SIP) request message and the third signaling message comprises a subsequent SIP request message.

22. The network device in accordance with claim 13 wherein the network device is further configured to:

receive a third signaling message at the first network device from another network device, the third signaling message including the second address and the hash identifier;

determine the first address from the received hash identifier;

generate at the first network device, a fourth signaling message comprising the third signaling message including the first address identifying the originating endpoint device; and transmit the fourth signaling message to the originating endpoint device.

23. A computer program embodied on a non-transitory computer readable medium and operable to be executed by a processor, the computer program comprising computer readable program code for:

receiving a first signaling message at a first network device from an originating endpoint device, the first signaling message corresponding to a communication session between the originating endpoint device and a destination endpoint device, and having a contact field comprising a first address identifying the originating endpoint device;

storing the first address;

generating and storing a hash identifier;

mapping the hash identifier to the first address;

generating, at the first network device, a second signaling message comprising the second first signaling message having a modified contact field comprising the hash identifier and a second address identifying the first network device as a contact point to the destination endpoint device; and transmitting the second signaling message to a second network device;
receiving a third signaling message at the network device from another network device, the third signaling message including the second address and the hash identifier;
determine the first address from the received hash identifier; and
transmit the third signaling message to the originating endpoint device.

* * * * *

UNITED STATES PATENT AND TRADEMARK OFFICE
CERTIFICATE OF CORRECTION

PATENT NO. : 9,749,296 B1
APPLICATION NO. : 11/592599
DATED : August 29, 2017
INVENTOR(S) : Meenakshi Kaushik, Francois Audet and Samir Srivastava It is certified that error appears in the above-identified patent and that said Letters Patent is hereby corrected as shown below:

In the Claims

At Column 15, Line 3, please delete "to" therein.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*